Figure 1:
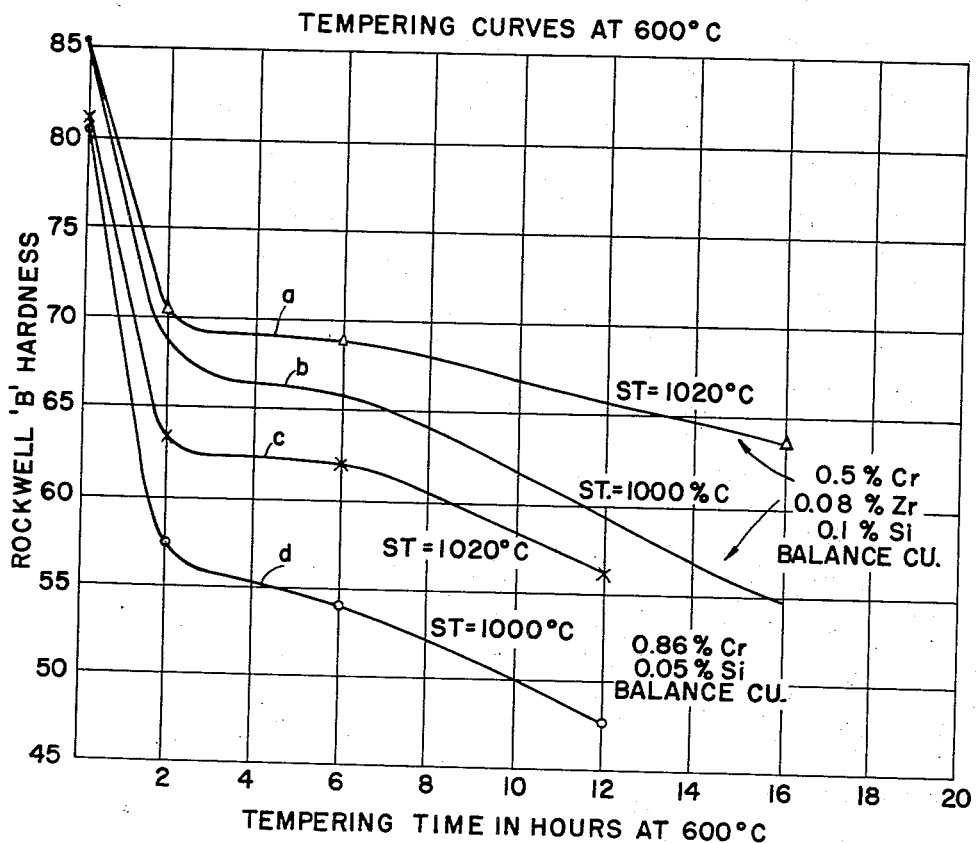

United States Patent Office 3,143,442
Patented Aug. 4, 1964

3,143,442
COPPER-BASE ALLOYS AND METHOD OF
HEAT TREATING THEM
George Roland Watts, Bishops Stortford, Herts, England,
assignor to P. R. Mallory & Co., Inc., Indianapolis,
Ind., a corporation of Delaware
Filed Jan. 23, 1962, Ser. No. 168,126
14 Claims. (Cl. 148—160)

This invention relates to improvements in and relating to copper-base alloys and more particularly to copper-chromium alloys for use in the manufacture of welding electrodes.

Copper-chromium alloys, containing up to about 2% Cr are well-known and have long been used for the manufacture of welding electrodes on account of their physical properties, after suitable heat-treatment, of relatively high heat and electrical conductivity, and hardness.

Alloys of copper and zirconium are also known for use in making welding electrodes. For example, it has been proposed to produce an age-hardened copper-base alloy for electrode production by subjecting an alloy of copper and 0.1%–5% zirconium to an age-hardening treatment comprising heating the alloy to a temperature of 700°–1000° C. followed by rapid cooling by quenching in water and subsequently re-heating the alloy to a temperature below 700° C., preferably 300°–500° C. Alloys, produced in this manner, are stated to have comparatively high strength at elevated temperatures and to be resistant to wear and softening at these temperatures. If desired the alloy may contain additions of other metals which do not affect the properties of the hardened alloy.

Alloys of the aforementioned types have, hitherto, been found acceptable for use in the manufacture of welding electrodes, mainly owing to the fact that they offer advantageous characteristics for this purpose compared with metallic copper or other copper-base alloys or other known alloys possessing the minimum essential properties required of electrode material.

Copper-chromium alloys, however, whilst possessing the requisite hardness and heat and electrical conductivity, have a tendency to rapid intercrystalline failure or cracking when stressed at elevated temperatures above 200° C. with little or no elongation, thereby severely limiting the welding life of an electrode made of this material. Moreover, electrodes made of this material are liable to undesirable softening and deformation, resulting in mushrooming after extended use at these temperatures.

The age-hardened copper-zirconium alloys have the advantage that they exhibit a decreased rate of softening, when heated to elevated temperatures for an extended period, compared with copper-chromium alloys, but they do not exhibit the hardness of the latter alloys and from that aspect are not so suitable for welding electrode purposes.

In an endeavour to improve the overall properties of welding electrode materials and to provide a material which would not only combine the desirable properties of both copper-chromium alloys and copper-zirconium alloys, but which would exhibit these properties to a considerably enhanced degree, the Applicants have experimented with the heat treatment of copper-base alloys containing both chromium and zirconium and have unexpectedly found that a normal copper-chromium alloy, containing up to about 2% of chromium and to which is added a small amount of zirconium will, if subject to a particular form of heat-treatment, exhibit greatly improved characteristics for welding electrode purposes compared with the binary copper-chromium, or copper-zirconium, alloys at present in use for this purpose.

The principal object of this invention, therefore, is to improve copper-base alloy welding electrode material.

Another object of the invention is to provide a copper-base alloy welding electrode material which exhibits an increased resistance to cracking when stressed at temperatures above about 200° C. as compared with normal copper-chromium alloys.

A further object of the invention is to provide a copper-base alloy welding electrode material which exhibits a decreased rate of softening and an increased resistance to deformation in use at elevated temperatures of above about 200° C.

According to one feature of the invention, there is provided a method of producing a copper-base alloy welding electrode material exhibiting improved properties in use which method comprises preparing a copper-base alloy containing from a minor amount up to 2% by weight of chromium and a minor amount by weight, as hereinafter defined, of zirconium, and balance copper and then subjecting said alloy to a heat-treatment comprising heating the alloy to a temperature varying from about 1000° C. up to the solidus temperature of the alloy, rapidly quenching the alloy from this temperature and subsequently ageing the alloy at a temperature of from 300° C. to 500° C. for a suitable time so as fully to develop the properties thereof.

According to another feature of the invention, a method of heat-treating a copper-base alloy, containing from a minor amount up to 2% by weight of chromium and a minor amount by weight, as hereinafter defined, of zirconium and balance copper, comprises heating said alloy to a temperature varying from above 1000° C. up to the solidus temperature of the alloy, rapidly quenching the alloy from this temperature and subsequently ageing the alloy at a temperature of from 300° C. to 500° C. for a suitable time so as fully to develop the properties thereof.

As the solidus temperature of a copper-chromium-zirconium alloy will be found to vary inversely as the zirconium content of the alloy, in other words, the higher is the zirconium content, the lower is the solidus temperature, it is not possible categorically to define the limits of the zirconium content which may be present in the alloy, as, in order to take maximum advantage of as high a quenching temperature as possible, it is clearly desirable to keep the zirconium content of the alloy to a minimum value consistent with obtaining the advantages of the presence of some zirconium in the alloy. The expression "a minor amount of zirconium," as used herein and in the claims is intended, therefore, to mean an amount of from about 0.02% up to an amount which does not have the effect of depressing the solidus temperature of the alloy to as low as 1000° C.

The inclusion of from 0.02% to 0.1% by weight of zirconium in the alloy has been found particularly suitable for the purposes of the invention.

The chromium content of the alloy is, preferably, kept within the range of 0.25–1.1%, and, if desired, up to 0.1% of silicon may also be included.

According to yet another feature of the invention, there is provided a copper-base alloy, suitable for use as welding electrode material, composed of from a minor amount up to 2% by weight of chromium, a minor amount by weight, as hereinabove defined, of zirconium and balance copper with or without the addition of up to 0.1% by weight of silicon, which alloy has been heat treated by the method of the invention.

In carrying out the invention in practice, an alloy containing 0.5% of chromium, 0.08% of zirconium, 0.1% of silicon and balance copper, when heat-treated in accordance with the invention, will be found to possess greatly improved properties for use as welding electrode material, the heat-treatment advantageously comprising heating the alloy to a temperature of 1020° C. quenching the alloy in water and subsequently aging the alloy at a temperature of 450° C. for a period of 16 hours.

Figure 2:
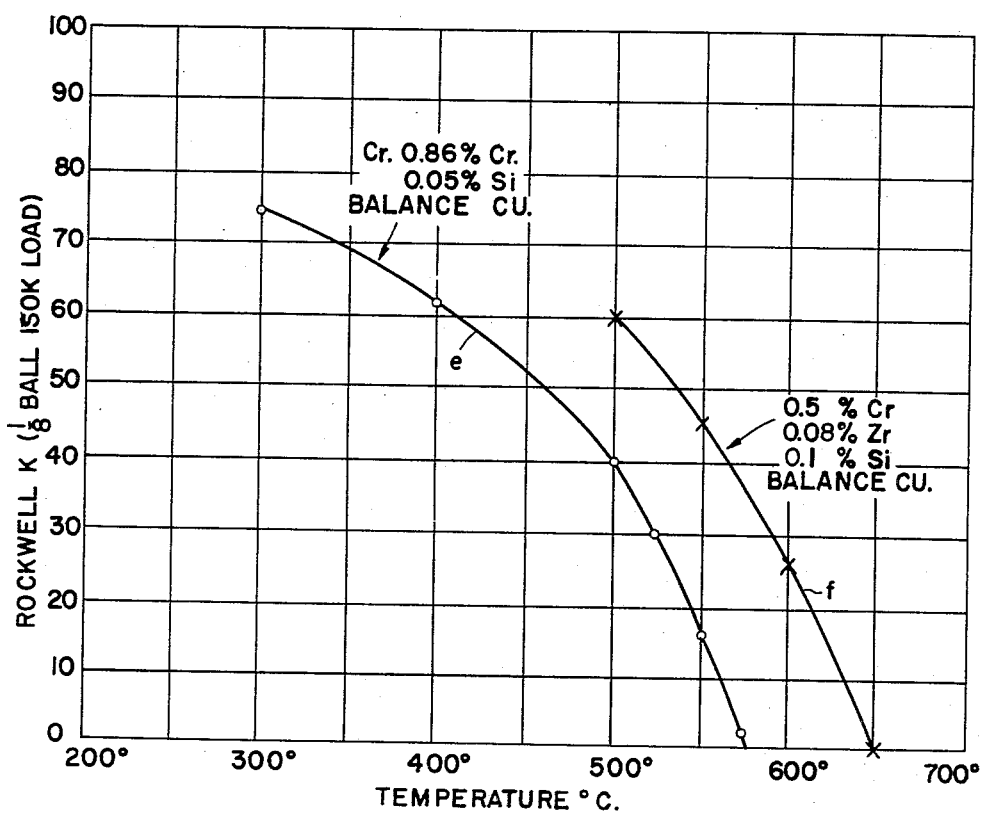

The improvement is properties of alloys made in accordance with the teachings of the invention are clearly demonstrated from a consideration of the accompanying drawings, to which reference should now be had, and in which:

FIGURE 1 is a graph showing, on the Rockwell "B" scale, the hardness at room temperature of an alloy in accordance with the invention after reheating at 600° C. for varying periods compared with the hardness of an alloy of the same composition but which had not been heat-treated in accordance with the invention, after similar reheating treatment and also showing the room-temperature hardness after similar treatment of a known copper-base alloy which had been normally heat-treated and one which had been heat-treated in accordance with the invention, and FIGURE 2 is a graph showing the result of hot hardness tests carried out on an alloy embodying the invention and on a known copper-base alloy of the same composition as that used to obtain the results of FIGURE 1.

Referring to the drawings, and first to FIGURE 1 thereof, curve $a$ represents the room temperature hardness of an alloy composed of 0.5% chromium, 0.08% zirconium, 0.1% silicon and balance copper, and which had been heat-treated in accordance with the method of the invention, comprising in this instance, heating to a temperature of 1020° C., quenching in water and then ageing at 450° C. after reheating at 600° C. for varying periods, up to 16 hours.

Curve $b$ represents the room-temperature hardness of an alloy of the same composition but which had been quenched from a temperature of 1000° C. only, and then aged at 450° C. after similar reheating treatment.

As will be clearly seen from these curves, an alloy embodying, and heat-treated in accordance with, the invention exhibited, after tempering at 600° C. for a period of 12 hours, a room-temperature hardness of 66 Rockwell "B," whereas a similar alloy quenched from a temperature of 1000° C. only and subsequently aged, exhibited, after reheating at 600° C. over the same period of time a room-temperature hardness of only 60 Rockwell "B."

Curves $c$ and $d$ show, by way of comparison, the room temperature hardness, after similar reheating treatment, of a known copper-chromium alloy, containing 0.86% chromium, 0.05% silicon and balance copper, which had been heat treated in accordance with the invention and comprising quenching from a temperature of 1020° C. and ageing at 450° C. (curve $c$) and that of an alloy of the same composition, but which had been quenched from only 1000° C. before ageing (curve $d$).

The improved resistance to reheating of alloys embodying the teachings of the invention will be clearly apparent from a consideration of these tempering curves.

Referring now to FIGURE 2, this figure shows graphically the results of hot hardness tests carried out on the two alloys previously tested with the use of 1/8 inch tungsten carbide ball, the hardness, therefore, being indicated according to the Rockwell K scale. Curve $e$ shows the results obtained with the normal alloy material composed of 0.86% chromium, 0.05% silicon and balance copper and curve $f$ those obtained with an alloy embodying the invention and composed of 0.5% chromium, 0.08% of zirconium, 0.1% silicon and balance copper.

The improved behaviour of the alloy in accordance with the invention is clearly apparent from these two curves, and further explanation is not thought necessary.

It is to be understood that alloys prepared in accordance with the teachings of the invention may, if desired, be cold worked, either after quenching and before ageing or after the ageing treatment, in order further to improve the mechanical properties of the alloys.

Moreover, the alloys will be found to exhibit greatly improved creep properties within a temperature range of 200–500° C. and improved elongation in creep without inter-crystalline cracking within this temperature range. In addition the alloys possess an improved short time tensile strength and elongation within the 200–500° C. temperature range.

These improved properties will be more readily appreciated from the following comparison tests of various alloys embodying the invention and of normal prior art copper-chromium alloy electrode material.

TEST I. Creep Properties

In this test, there were used ($a$) a binary copper-chromium alloy containing 1.35% chromium and ($b$) a ternary copper-chromium-zirconium alloy containing 1.35% chromium and 0.01% zirconium and heat-treated in accordance with the invention.

Both alloys were tested in creep at 400° C. Alloy ($a$) failed after 172 hours with a stress of only 4 tons/sq. inch, whereas alloy ($b$) withstood a stress of 6 tons/sq. inch for 250 hours without failure.

TEST II. Elongation in Creep

The same alloys as were used in Test I were also used for this test. Both alloys were placed under a stress of 6 tons/sq. inch at a temperature of 300° C. After a period of 250 hours, alloy ($a$) showed a strain of 0.73%, whereas alloy ($b$) showed a strain of 1.42%.

TEST III. Short Time Tensile Strength

This test was carried out at room temperature and at a temperature of 400° C. on a normal binary copper-chromium alloy containing 0.86% chromium and balance copper and on a copper-chromium-zirconium alloy in accordance with the invention and containing 0.80% chromium and 0.10% zirconium and balance copper.

The binary copper-chromium alloy gave an elongation figure of 3–4% at 400° C. and a figure of 14% at room temperature. The ternary alloy of the invention, on the other hand, gave at 400° C. an elongation figure of 8–10% and at room temperature a figure of 11–12%. As will be seen, the drop in elongation of the alloy of the invention under heat is small compared with that of the standard alloy.

In order to demonstrate the improved results obtainable in practical welding operations by the use of welding electrodes formed of the material of the invention, compared with the results obtainable with standard copper-chromium electrodes, the following further test was carried out.

Cold rolled steel sheets of 0.05" in thickness were spot welded together firstly with the use of copper-chromium electrodes and then with electrodes formed of an alloy of copper-chromium-zirconium containing 1% chromium and 0.1% of zirconium heat-treated in accordance with the invention and the percentage increase in electrode area and loss in electrode length were measured in each case after 5000 spot welds. The following results were obtained:

| Electrode | Percent increase in electrode area | Loss in electrode length, inches |
|---|---|---|
| Copper-chromium | 31.7 | 0.0035 |
| Copper-chromium-zirconium | 26.5 | 0.001 |

It is to be understood that the invention is intended to include within its scope welding electrodes when made from copper-chromium-zirconium alloys having a composition in accordance with, and which have been heat-treated in accordance with, the invention.

What I claim is:

1. A method of producing a copper-base alloy welding electrode material which comprises preparing a copper-base alloy containing from a small but effective amount up to 2% by weight of chromium and a small but effective amount up to 0.1% by weight of zirconium and balance copper and subjecting said alloy to a heat-treatment comprising heating the alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

2. A method of heat-treating a copper-base alloy containing from a small but effective amount up to 2% by weight of chromium and a small but effective amount up to 0.1% by weight of zirconium and balance copper which comprises heating said alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

3. A method of producing a copper-base alloy welding electrode material which comprises preparing a copper-base alloy containing from a small but effective amount up to 2% by weight of chromium and from 0.02% to 0.1% by weight of zirconium and balance copper and subjecting said alloy to a heat-treatment comprising heating the alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

4. A method of heat-treating a copper-base alloy containing from a small but effective amount up to 2% by weight of chromium and from 0.02% to 0.1% by weight of zirconium and balance copper which comprises heating said alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

5. A method of producing a copper-base alloy welding electrode material which comprises preparing a copper-base alloy containing from 0.25% to 1.1% by weight of chromium and a small but effective amount up to 0.1% by weight of zirconium and balance copper and subjecting said alloy to a heat-treatment comprising heating the alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

6. A method of heat-treating a copper-base alloy containing from 0.25% to 1.1% by weight of chromium and a small but effective amount up to 0.1% by weight of zirconium and balance copper which comprises heating said alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

7. A method as claimed in claim 1 wherein the alloy contains a small but effective amount up to 0.1% by weight of silicon.

8. A method as claimed in claim 2 wherein the alloy contains a small but effective amount up to 0.1% by weight of silicon.

9. A method of producing a copper-base alloy welding electrode material which comprises preparing a copper-base alloy containing 0.5% by weight of chromium, 0.08% by weight of zirconium, 0.1% by weight of silicon, and balance copper and subjecting said alloy to a heat-treatment comprising heating the alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

10. A method of heat-treating a copper-base alloy containing 0.5% by weight of chromium, 0.08% by weight of zirconium, 0.1% by weight of silicon, and balance copper which comprises heating said alloy to a temperature varying from above 1000° C. up to the solidus temperature of the alloy, rapidly quenching the alloy from this temperature and subsequently ageing the alloy at a temperature of 300–500° C. for a time so as fully to develop the overall properties thereof.

11. A method of producing a copper-base alloy welding electrode material which comprises preparing a copper-base alloy containing from a small but effective amount up to 2% by weight of chromium and a small but effective amount up to 0.1% by weight of zirconium and balance copper and subjecting said alloy to a heat-treatment comprising heating the alloy to a temperature varying from above 1000° C. up to the solidus temperature of the alloy, rapidly quenching the alloy from this temperature and subsequently ageing the alloy at a temperature of 450° C. for a period of 16 hours so as fully to develop the overall properties thereof.

12. A method of heat-treating a copper-base alloy containing from a small but effective amount up to 2% by weight of chromium and a small but effective amount up to 0.1% by weight of zirconium and balance copper which comprises heating said alloy to a temperature varying from above 1000° C. up to the solidus temperature of the alloy, rapidly quenching the alloy from this temperature and subsequently ageing the alloy at a temperature of 450° C. for a period of 16 hours so as fully to develop the overall properties thereof.

13. A method of producing a copper-base alloy welding electrode material which comprises preparing a copper-base alloy containing from a small but effective amount up to 2% by weight of chromium and a small but effective amount up to 0.1% by weight of zirconium and balance copper and subjecting said alloy to a heat-treatment comprising heating the alloy to a temperature of 1020° C., rapidly quenching the alloy from this temperature and subsequently ageing the alloy at a temperature of 300–500° C. for a time so as fully to develop the overall properties thereof.

14. A method of heat-treating a copper-base alloy containing from a small but effective amount up to 2% by weight of chromium and a small but effective amount up to 0.1% by weight of zirconium and balance copper which comprises heating said alloy to a temperature of 1020° C., rapidly quenching the alloy from this temperature and subsequently ageing the alloy at a temperature of 300–500° C. for a time so as fully to develop the overall properties thereof.

References Cited in the file of this patent
UNITED STATES PATENTS

| | | |
|---|---|---|
| 2,025,662 | Hensel et al. | Dec. 24, 1935 |
| 2,127,596 | Hensel et al. | Aug. 23, 1938 |